United States Patent [19]

Noda et al.

[11] Patent Number: 4,916,740
[45] Date of Patent: Apr. 10, 1990

[54] INPUT APPARATUS FOR COMPUTER

[75] Inventors: Atsushi Noda, Takatsuki; Haruyuki Koizumi; Shinya Sonoda, both of Kyoto; Shinji Maeda, Kurayoshi, all of Japan

[73] Assignee: Omron Tateisi Electronics Co., Kyoto, Japan

[21] Appl. No.: 361,716

[22] Filed: Jun. 2, 1989

Related U.S. Application Data

[63] Continuation of Ser. No. 130,608, Dec. 9, 1987, abandoned.

[30] Foreign Application Priority Data

Dec. 15, 1986 [JP] Japan .................. 61-298164
Dec. 17, 1986 [JP] Japan .................. 61-300626

[51] Int. Cl.⁴ .......................... G06K 9/22; G06K 9/20
[52] U.S. Cl. ........................ 382/59; 382/61; 341/23; 340/712; 178/18; 364/900; 364/709.1
[58] Field of Search ............... 341/23; 340/711, 712; 382/59, 61, 60; 178/18, 19; 364/200, 709.1, 700, 900

[56] References Cited

U.S. PATENT DOCUMENTS

| 3,936,596 | 2/1976 | Inuiya | 382/59 |
| 4,385,366 | 5/1983 | Housey, Jr. | 364/900 |
| 4,716,542 | 12/1987 | Peltz et al. | 178/18 |
| 4,730,186 | 3/1988 | Koga et al. | 178/18 |
| 4,763,252 | 8/1988 | Rose | 341/23 |

FOREIGN PATENT DOCUMENTS 0155409 9/1985 European Pat. Off. .

OTHER PUBLICATIONS

New Electronics, vol. 18, No. 23, Nov. 26th, 1985, pp. 55, 57, London, GB; L. Alen: "Keyless Device Eases Data Entry".

Primary Examiner—Leo H. Boudreau
Assistant Examiner—Michael Razavi
Attorney, Agent, or Firm—Stevens, Davis, Miller & Mosher

[57] ABSTRACT

An input apparatus for computers is interposed between a keyboard and the computer. This apparatus comprises: an area designating device on which a desired visible information sheet having predetermined visible information can be disposed and which outputs a designation area signal indicative of the designated area of the visible information; a receiver to receive registration data comprising the area of the visible information and the key code of one or a series of plurality of keys corresponding to this area, the registration data being sent from an external system; a registering memory to store the registration data received by the receiver; a data fetching circuit to take out the corresponding key code from the registering memory by reference to the registration data in response to the designation area signal which is given from the area designating device; and a transmitter to transmit the fetched key code to the computer. With this apparatus, by previously making a desired visible information sheet and the registration data of the sheet, the registration data can be easily registered in the input apparatus, so that the operator can easily operate the input apparatus and input the key code to the computer by designating the area on the sheet.

22 Claims, 14 Drawing Sheets

Fig.3

| CODE | FUNCTION | CORRESPONDING KEY |
|---|---|---|
| 16 | | CTRL + P |
| 17 | RELEASE TEMPORARY STOP OF EXECUTION OF PROGRAM AND OF DISPLAY ON SCREEN | CTRL + Q |
| 18 | ENTER INSERTING MODE | CTRL + R  PAST INS |
| 19 | TEMPORARILY STOP OF EXECUTION OF PROGRAM AND OF DISPLAY ON SCREEN | CTRL + S |
| 20 | | CTRL + T |
| 21 | DELETE ONE LINE FROM SCREEN | CTRL + U |
| 22 | | CTRL + V |
| 23 | | CTRL + W |
| 24 | | CTRL + X |
| 25 | | CTRL + Y |
| 26 | | CTRL + Z |
| 27 | ENTER ESCAPE SEQUENCE | ESC |
| 28 | MOVE CURSOR TO THE RIGHT | ◁ |
| 29 | MOVE CURSOR TO THE LEFT | ▷ |
| 30 | MOVE CURSOR UPWARDLY | ▽ |
| 31 | MOVE CURSOR DOWNWARDLY | △ |

Fig. 4

| | | | | | | | | | |
|---|---|---|---|---|---|---|---|---|---|
| A | B | C | D | E | ア (a) | イ (i) | ウ (u) | エ (e) | オ (o) |
| F | G | H | I | J | カ (ka) | キ (ki) | ク (ku) | ケ (ke) | コ (ko) |
| K | L | M | N | O | サ (sa) | シ (shi) | ス (su) | セ (se) | ソ (so) |
| P | Q | R | S | T | タ (ta) | チ (chi) | ツ (tsu) | テ (te) | ト (to) |
| U | V | W | X | Y | ナ (na) | ニ (ni) | ヌ (nu) | ネ (ne) | ノ (no) |
| Z | | | | | ハ (ha) | ヒ (hi) | フ (fu) | ヘ (he) | ホ (ho) |
| | | | | | マ (ma) | ミ (mi) | ム (mu) | メ (me) | モ (mo) |
| | | | | | ヤ (ya) | | ユ (yu) | | ヨ (yo) |
| | | | | | ラ (ra) | リ (ri) | ル (ru) | レ (re) | ロ (ro) |
| | | | | | ワ (wa) | | | | ヲ (o) |
| | | | | | ン (n) | | | | |

| | | S3 |
|---|---|---|
| ○○ CORPORATION | 8 2 1 9 5 | |
| ○○ MANUFACTURING CO., LTD. | 6 0 3 2 1 | |
| ○○ CONSTRUCTION CO., LTD | 3 3 9 5 7 | |
| ○○ DEPARTMENT STORE | 8 1 8 3 6 | |
| ○○ TRANSPORT CO., LTD. | 4 2 3 1 0 | |
| ○○ INDUSTRY CO., LTD. | 5 3 3 2 1 | |
| ○○ INDUSTRIAL CO., LTD. | 1 9 3 0 4 | |
| ○○ CORPORATION | 1 1 2 5 1 | |

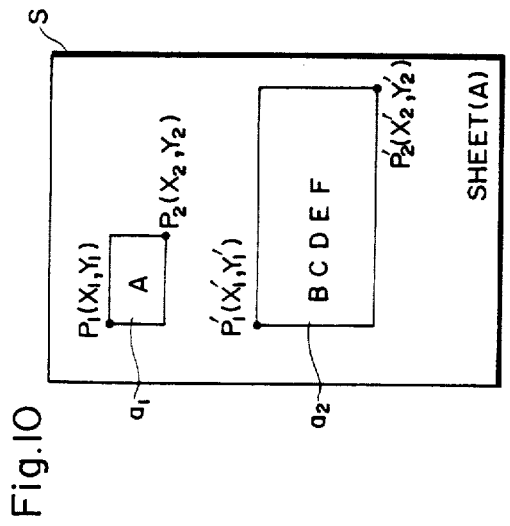

Fig.11

| SHEET NO. | SHEET NAME | CAPACITY (Kbyte) |
|---|---|---|
| 1 | SHEET (A) | 2.53 |
| 2 | SHEET (B) | 3.12 |
| 3 | SHEET (C) | 1.68 |
| 4 | SHEET (D) | 0.92 |
| 5 | SHEET (E) | 2.31 |

INPUT THE SHEET NUMBER FROM THE KEYBOARD

INPUT APPARATUS FOR COMPUTER

This application is a continuing application of Ser. No. 130,608, filed Dec. 9, 1987.

BACKGROUND OF THE INVENTION

The present invention relates to an input apparatus used to input desired data to a computer.

As an input apparatus for a computer, there is generally used a keyboard for inputting data by sequentially operating a plurality of keys arranged. In addition, there are known a digitizer of the type to input data by allowing a stylus pen to come into contact with the upper surface of a tablet, a touch panel of the type to input data by allowing a light pen or a finger to directly come into contact with the surface of a CRT screen, a mouse of the type to input data by rotating balls or the like on a desk, a bar code reader of the type to input data by scanning bar codes with use of a light pen, and the like.

However, in the case of the keyboard, there is a problem such that it takes a fairly long time for the operator to be familiar to the key arrangement and to improve the operating speed by being experienced with the key operations. On the other hand, in the case of the other input apparatuses, although the operating efficiency is better than that of the keyboard, there is a disadvantage such that they can be applied to only a computer having a special software because they have their own interfaces and the like.

SUMMARY OF THE INVENTION

It is an object of the present invention to provide a novel input apparatus for computers which can be also applied to a computer having no special software and which is excellent in the operating efficiency.

To accomplish the above object, according to the present invention, there is provided an input apparatus for computers which is interposed between a keyboard and a computer main unit, wherein this input apparatus comprises: area designating means on which a visible information sheet having predetermined visible information is attachably and detachably disposed and which outputs a designation area signal indicative of a designated area of the visible information; receiving means for receiving a key code signal from the keyboard; registering means for correspondingly registering the area of the visible information designated by the area designating means and the key code received by the receiving means; and transmitting means for taking out the corresponding key code from the registering means in response to the designation area signal which is output from the area designating means and for transmitting this key code to the computer.

When registering, the operator designates a desired area on the visible information sheet put on the area designating means and also inputs a key code of one or a plurality of series of keys by the keyboard. The input key code signal is received by the receiving means. This key code and the designated area of the visible information are registered as mutually corresponding data into the registering means. The registering operations and processes are repeatedly executed for a desired number of areas on the visible information sheet.

After completion of the registering operations and processes, the operator can execute the input operations and processes using the input apparatus according to the invention. Namely, the operator designates the area of a desired visible information on the visible information sheet by use of the area designating means. Thus, the key code corresponding to the designated area is taken out of the registering means and transmitted to the computer through the transmitting means.

According to the invention, in any case, the signal transmitted through the interface of a computer is the key code which is the same as the key code input from the keyboard. Therefore, the invention can be used for all of the computers having the software capable of processing the key code signal from the keyboard. Moreover, a simpler and easier input operation can be attained.

Prior to using the foregoing input apparatus for computers, the visible information sheet having the visible information is set to the input apparatus. The operation to designate a desired area of the visible information and the operation of the keyboard are performed in parallel, thereby producing the registration data in which the key code is made to correspond to each designated area. This registration data is previously registered into the registering means in the input apparatus. Therefore, after completion of the data registration, by designating a desired area on the visible information sheet, the corresponding key code can be taken out of the registering means and transmitted to the computer.

In the case of the input apparatus of the invention, although the input operations of the key codes are made easy and simplified, it is necessary to execute the complicated works for the registering operations and processes before the input apparatus is used. Further, this registering work needs to be individually performed for every apparatus.

Another object of the present invention is to provide an input apparatus for computers in which the complicated registering work is eliminated by enabling the registration data to be fed from an external system, a computer for example.

A further improved input apparatus for computers according to the invention comprises: area designating means on which a visible information sheet having predetermined visible information is attachably and detachably disposed and which outputs a designation area signal indicative of a designated area of the visible information; receiving means for receiving registration data comprising the area of the visible information and one or a plurality of key codes corresponding to the area from an external system; memory means for storing the registration data received by the receiving means; data fetching means for taking out the corresponding key code from the memory means by reference to the registration data in response to the designation area signal which is output from the area designating means; and transmitting means for transmitting the fetched key code to the computer.

Prior to using the input apparatus, the registration data comprising the area of the visible information on the visible information sheet and the key code corresponding to the area is received from an external system and stored into the memory means.

In the input operation of the key code, after a desired visible information sheet was set, the area of desired visible information is designated by the area designating means. Thus, the key code corresponding to the designated area is taken out of the memory means and transmitted to the computer by the transmitting means.

According to the invention, the input operations are made easy and simplified and the complicated registering operation can be eliminated.

BRIEF DESCRIPTION OF THE DRAWINGS

FIGS. 3 to 5 are explanatory diagrams showing practical examples of visible information sheets;

FIG. 9 is an explanatory diagram showing an example of a constitution of registration data;

FIG. 10 is an explanatory diagram showing each area of visible information displayed on a visible information sheet;

FIG. 11 is an explanatory diagram showing a display screen of a display of a computer;

DETAILED DESCRIPTION OF THE PREFERRED EMBODIMENTS

Figure 1:
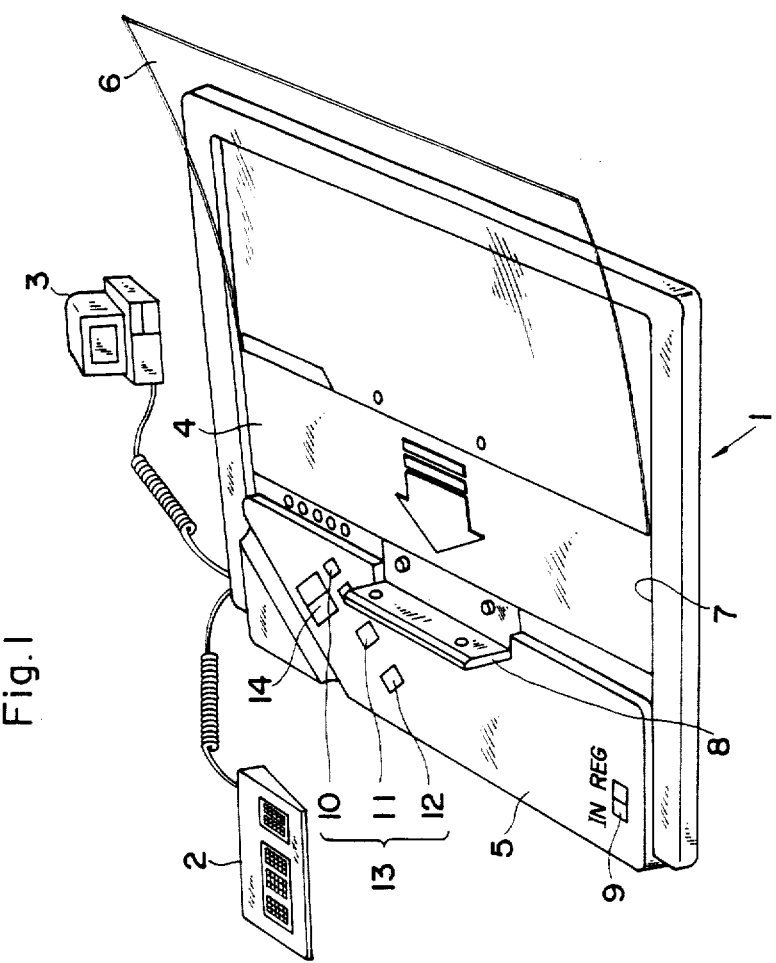
FIG. 1 is a perspective view of an input apparatus for computers according to an embodiment of the present invention.

FIG. 1 shows an external view of an input apparatus 1 for computers according to an embodiment of the present invention.

The input apparatus 1 for computers is connected between a keyboard 2 and a computer 3. The input apparatus 1 has a pad portion 4 on which a visible information sheet is attachably and detachably set and an operating section 5 in which various kinds of switches regarding the registering and transmitting operations and the like are arranged.

The pad portion 4 detects the point at which the operator depressed the surface of the visible information sheet and outputs a signal indicative of the position (X and Y coordinates) of the depressed point. The pad portion 4 has a concave portion 7 into which a transparent holder 6 is positioned. The visible information sheet is inserted into the transparent holder 6. The pad portion 4 also has a clip 8 to hold the transparent holder 6 in the concave portion 7.

The visible information relative to the keys on the keyboard 2 is written on the visible information sheet. Practical examples of the visible information sheets are illustrated in FIGS. 3 to 5.

The visible information sheet $S_1$ shown in FIG. 3 shows the operating method of the keyboard 2 by a table in which the functions of the computer and the kinds of keys which are operated to realize the functions are shown so as to correspond to each other.

The visible information sheet $S_2$ shown in FIG. 4 shows alphabets in accordance with the alphabetical order of A, B, C, and also shows Japanese KATAKANA characters in accordance with the order of the KATAKANA syllabary in a manner such that these alphabets and KATAKANA characters are arranged on one plane. As will be understood hereinafter, by pressing the areas of these characters over the pad portion 4, the key code signals which equivalently indicate that the keys of these characters on the keyboard 2 were depressed are given to the computer 3 from the input apparatus 1.

In a visible information sheet $S_3$ shown in FIG. 5, the name of the users and the codes of the users are correspondingly shown. In place of inputting numerals of a few digits indicative of the user's code by use of the keys on the keyboard 2, the sheet $S_3$ is put on the pad portion 4 and the area in which a user's name is written is depressed. In this manner, the operator can input the user's code.

Returning to FIG. 1, the operating section 5 is operated by the operator to perform the registering and inputting operations. The operating section 5 has: a change-over switch 9; a sheet selecting switch 10; a registration-end switch 11; a corresponding switch 12; and a display 14 to display the sheet number or various kinds of messages. The switch 10, 11, and 12 constitute a switch group 13. The switch 9 is used to select either the registering mode or the inputting mode. The switch 10 is used to select the number of visible information sheet which is set to the pad portion 4. The switch 11 is used to indicate the end of registering operation. The switch 12 is used to instruct the correspondence between the area of the visible information on the visible information sheet and the key code which is input by the keyboard 2.

Figure 2:
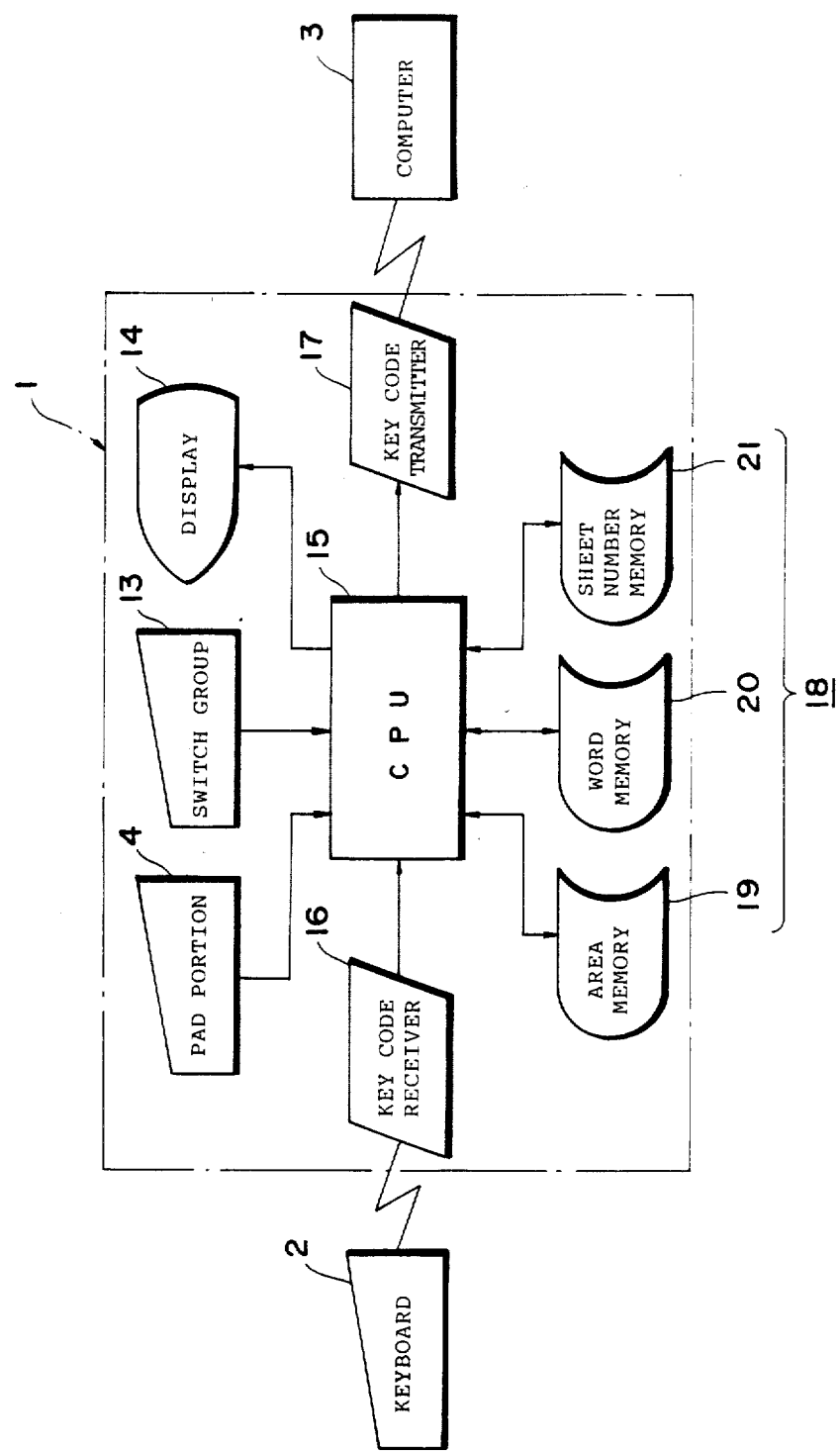
FIG. 2 is a block diagram showing an example of a circuit constitution of the input apparatus for computers.

FIG. 2 shows an example of a circuit constitution of the input apparatus 1. In addition to the pad portion 4, switch group 13 and display 14, a key code receiver 16, key code transmitter 17, and registering memory 18 are connected to a CPU 15.

The key code receiver 16 receives a key code signal sent from the keyboard 2. The key code read out from the registering memory 18 and the key code sent from the keyboard 2 are transmitted to the computer 3 by the transmitter 17.

The CPU 15 controls the input and output of the pad portion 4, switch group 13, display 14, key code receiver 16 and key code transmitter 17. While the CPU 15 reads or writes data from or into the registering memory 18, the CPU 15 executes various kinds of arithmetic operations and processes by use of various functions regarding the registration processing and transmission (input processing).

For example, the CPU 15 has the following functions and the like with respect to the registration.

(1) Function to define one closed area from the positions of a plurality of depressed points (in this embodiment, two points) detected in the pad portion 4.

(2) Function to store the data indicative of the defined area into an area memory 19 in the registering memory 18.

(3) Function to decide whether the present defined area overlaps the area which has previously been defined or not.

(4) Function to define as one word the key code train consisting of one or a plurality of key codes received by the key code receiver 16.

(5) Function to store the defined word into a word memory 20 in the registering memory 18 in correspondence to the defined area.

On the other hand, the CPU 15 has the following functions and the like with respect to the transmission (input processing).

(1) Function to decide to which defined area the position of the depressed point which was detected by the pad portion 4 belongs.

(2) Function to read out the key code train (including one key code) of the word corresponding to the defined area decided in above from the word memory 20 in the registering memory 18.

The sheet numbers assigned to the visible information sheets $S_1$, $S_2$, $S_3$, . . . are stored into a sheet number memory 21 in the registering memory 18. Each of the sheet numbers is also made to correspond to each area which is stored into the area memory 19.

Figure 6A:
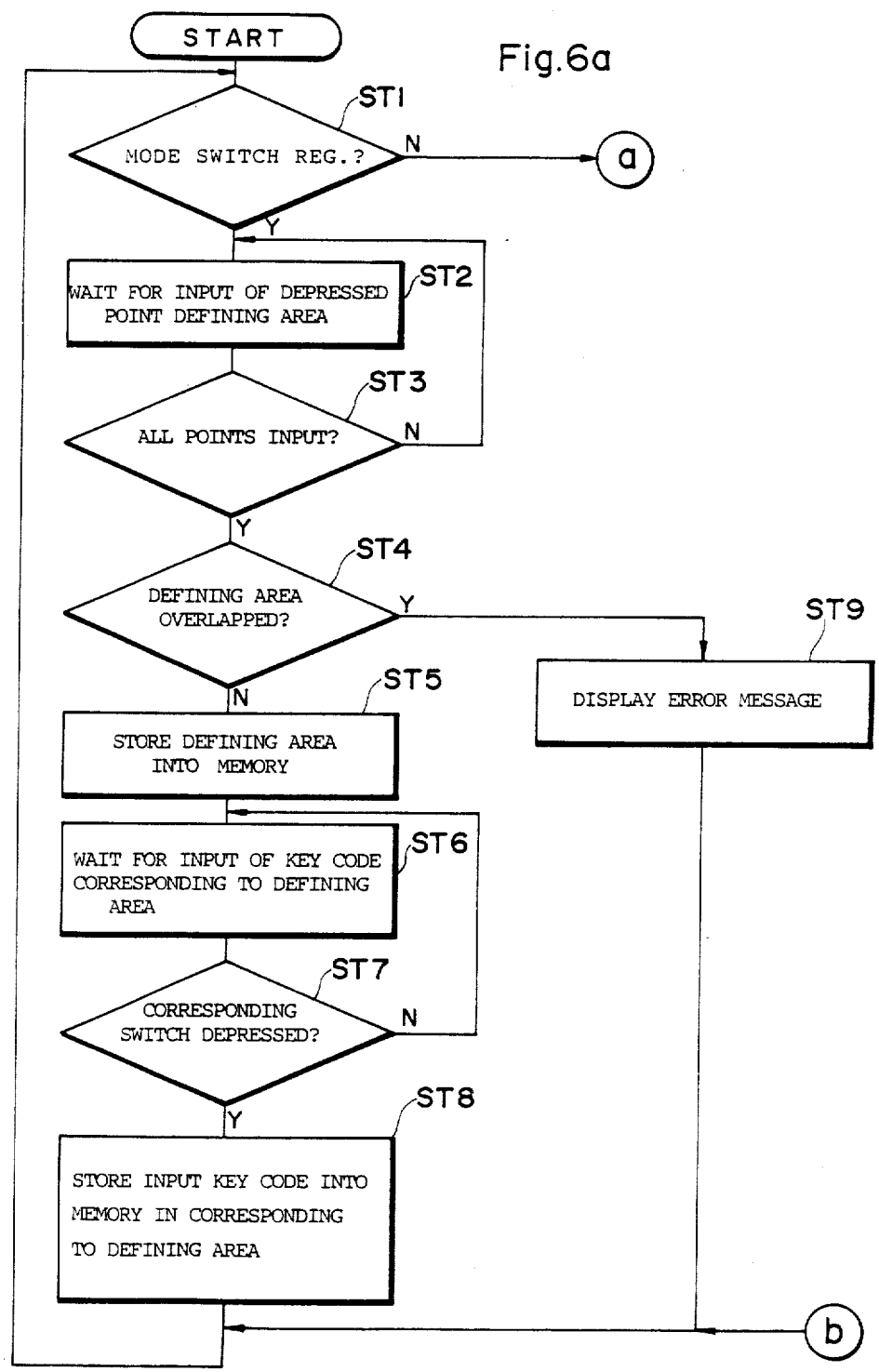
FIGS. 6a and 6b are flowcharts each showing the flow of the processing of the input apparatus for computers.
Figure 6B:
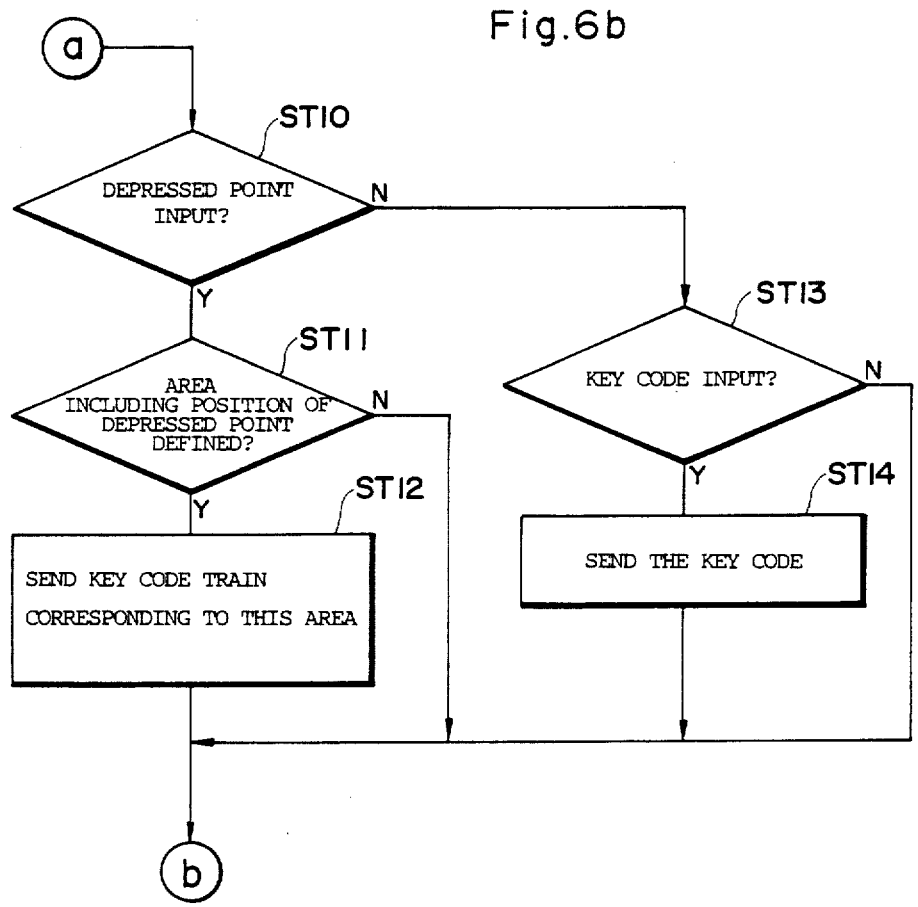

FIGS. 6a and 6b show the flows of the registering and inputting processings in the input apparatus 1.

Upon registration processing, after the operator first inserted a desired visible information sheet (in this case, $S_1$) into the holder 6, he sets the holder 6 to the pad portion 4. Next, by switching the switch 9 in the operating section 5 to "REGISTRATION (REG.)", the answer in step 1 (hereinafter, abbreviated to "ST1") in FIG. 6a is "YES". In ST2, the apparatus waits for the input of a depressed point to define the area.

When the operator sequentially depresses two corner points $P_1$ and $P_2$ on the visible information sheet $S_1$ by a finger or the like (refer to FIG. 3), the answer in ST3 is "YES" and the positions of the depressed points are detected by the pad portion 4. The CPU 15 sets a rectangular area a (indicated by bold lines in FIG. 3) which is specified by these depressed points as an area to be defined. In the next ST4, the CPU 15 refers to the area memory 19 in the registering memory 18 and checks to see if this defining area overlaps the area which has already been defined or not. If it is determined that they overlap ("YES" in ST4), ST9 follows and the CPU 15 displays an error message by the display 14.

On the contrary, if it is determined that they do not overlap ("NO" in ST4), the CPU 15 stores the defining area into the area memory 19 in the registering memory 18 and thereafter, the apparatus waits until the key code train corresponding to the defining area is received by the key code receiver 16 (ST5 and ST6).

When the "CTRL" and "S" keys on the keyboard 2 are sequentially depressed by the operator, the key code train is received by the key code receiver 16. When the operator subsequentialy depresses the corresponding switch 12 in the operating section 5, the answer in ST7 is "YES". Thus, the CPU 15 defines the key code train regarding the reception as one word and stores this word into the word memory 20 in correspondence to the defining area (ST8).

All of the areas on the visible information sheets $S_1$ are sequentially defined by repeating the above operation. After completion of the defining operations, the operator depresses the registration-end switch 11. Thus, the CPU 15 gives the sheet number to the visible information sheet $S_1$. This sheet number is stored into the sheet number memory 21 and also displayed by the display 14. The operator confirms the display content and writes the sheet number to a proper position on the sheet $S_1$. Thereafter, the sheet $S_1$ is exchanged to another visible information sheet and the similar operations are repeatedly executed.

When inputting (input processing), by first switching the switch 9 in the operating section 5 to "INPUT (IN.)" ("NO" in ST1), arbitrary sheet numbers are displayed on the display 14. The operator looks at the display content and depresses the sheet selecting switch 10 to change the sheet number, thereby selecting a desired visible information sheet (in this case, $S_1$) to be used now.

After the sheet $S_1$ of the selected sheet number was inserted into the transparent holder 6, the holder 6 is set to the pad portion 4.

When the operator wants to temporarily stop the program execution or the display on the screen, an arbitrary position in the area a on the sheet $S_1$ is depressed by the finger of the operator. Thus, the answer in ST10 is "YES" and the position of the depressed point is detected by the pad portion 4. The CPU 15 determines whether the area including the depressed point exists as the defining area or not (ST11) by referring to the content of the area memory 19. If the defining area exists, the answer in ST11 is "YES". In ST12, the CPU 15 then reads out the key code train (in this case, the key code train regarding the "CTRL" and "S" keys) corresponding to the defining area from the word memory 20 and sends to the computer 3 from the key code transmitter 17. Thus, the program as the function of this command is executed and the temporary stop of the execution of program or the display on the screen is executed in the computer 3.

Therefore, even if the operator does not know the method of operating the keys on the keyboard 2, the operator can execute the desired operation by the computer by merely finding out the explanation of "Temporary stop" written on the sheet $S_1$ and depressing the surface of this explanation area by the finger.

On the other hand, if it is necessary to input a different parameter every time in addition to a command, the operator inputs the parameter by the keyboard 2. In this case, the answer in ST13 regarding "Was the key code input?" is "YES". Thus, the key code received by the key code receiver 16 is directly transmitted to the computer 3.

Although the invention has been described above with respect to the example of the visible information sheet $S_1$ shown in FIG. 3, the same shall also apply to the other visible information sheets $S_2$ and $S_3$. For example, by use of the visible information sheet $S_2$ as shown in FIG. 4, even though the operator is not experienced with a keyboard of the JIS (Japanese Industrial Standard) arrangement, he can easily input characters. On the other hand, in the case of using the visible information sheet $S_3$ as shown in FIG. 5, even if the operator does not know the user's code, he can easily promptly input the user's code.

In the foregoing embodiment, the user can originally make his own visible information sheet and input desired data by use of this sheet. Therefore, the input apparatus for computers which can be remarkably easily used can be realized.

However, contrarily, the user must execute the registering operations and processings.

An explanation will now be made with respect to an improved input apparatus which does not always need the registering operations and processings.

Figure 7:
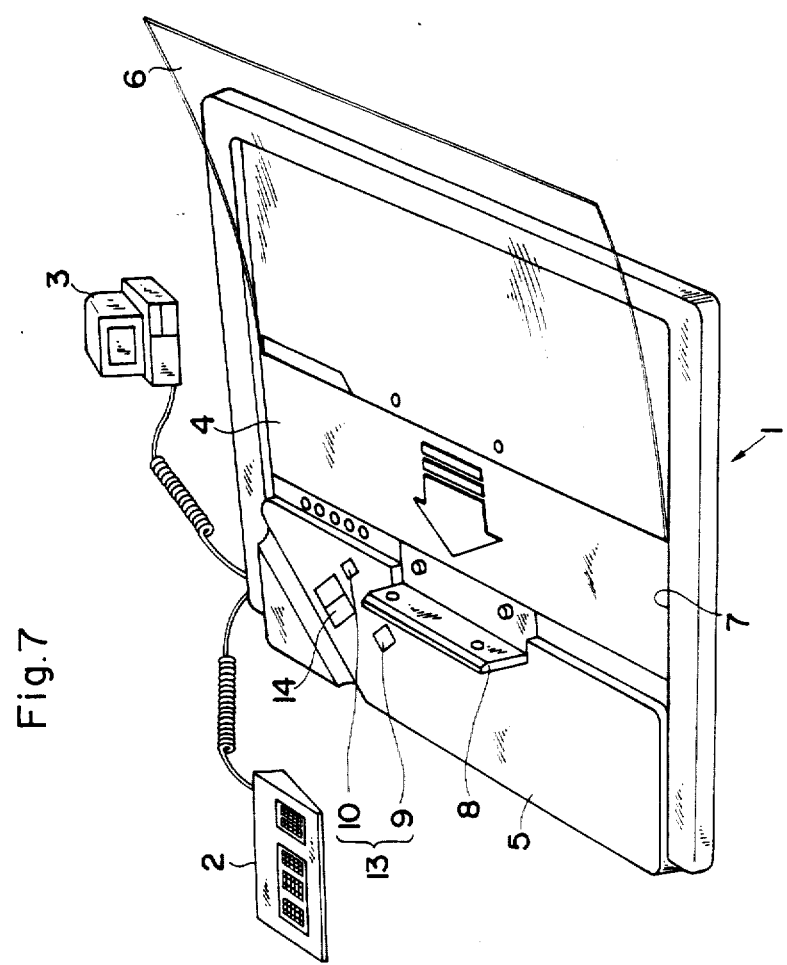
FIG. 7 is a perspective view of an input apparatus for computers-according to another embodiment of the invention.
Figure 8:
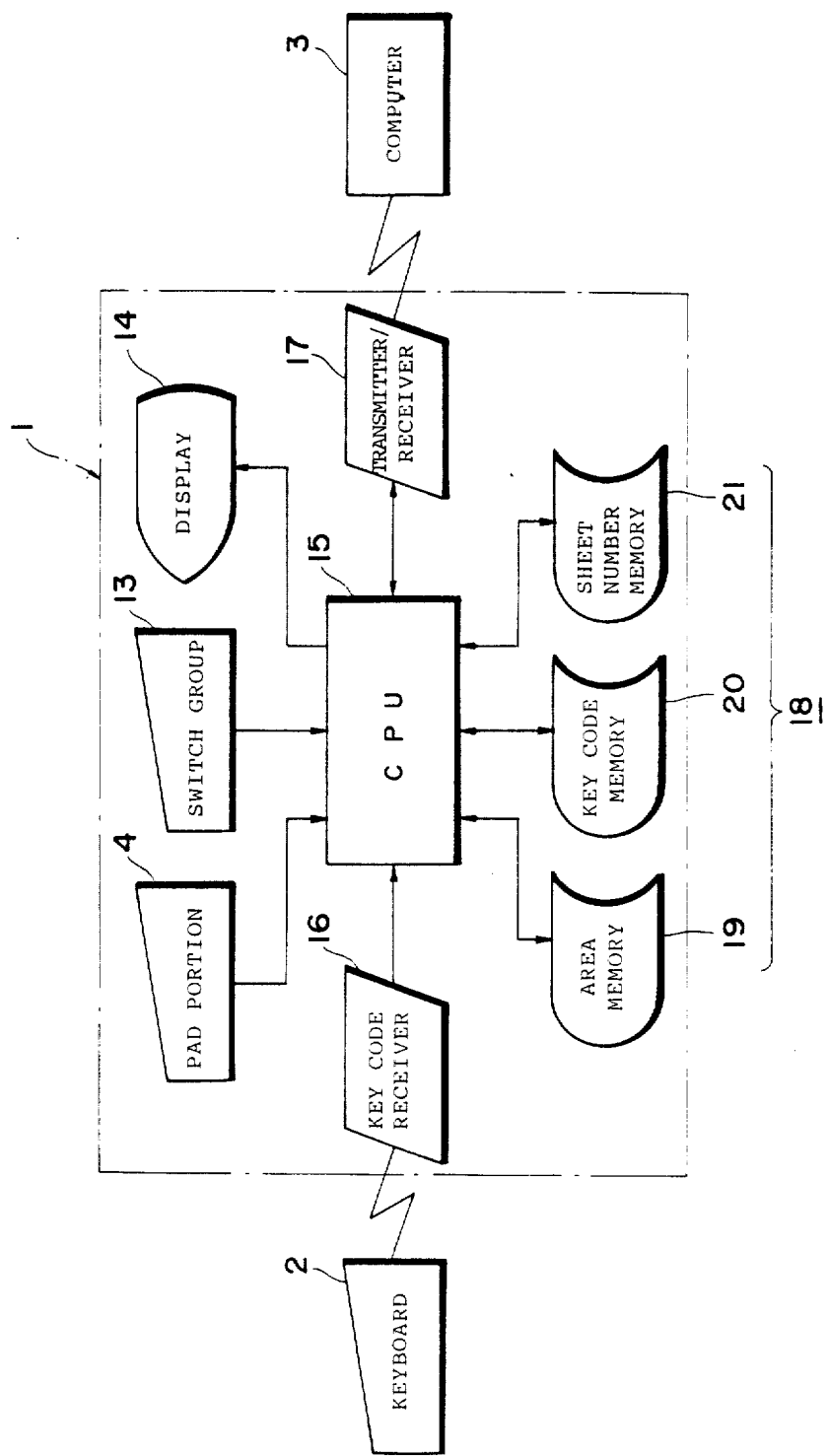
FIG. 8 is a block diagram showing an example of a circuit constitution of the input apparatus for computers.

FIGS. 7 and 8 show the improved input apparatus. The same or similar parts and components as those shown in FIGS. 1 and 2 are designated by the same reference numerals.

In FIG. 7, the mode change-over switch 9 and sheet selecting switching switch 10 constitute the switch group 13. The other switches 11, 12 and the like are not provided. The switch 9 is used to make the pad portion 4 operative or inoperative. The sheet slecting switch 10 is used to select the number of visible information sheet which is set to the pad portion 4.

In FIG. 8, a block indicated at numeral 17 is named as a transmitter/receiver. The transmitter/receiver 17 has the functions to transmit the key code read out from the registering memory 18 and the key code sent from the keyboard 2 to the computer 3 and to receive the registration data and other data from the computer 3 and other external systems.

The registration data comprises area of the visible information on the visible information sheet and a predetermined key code train (including one key code) corresponding to this area. For example, in the visible information sheet $S_1$ shown in FIG. 3, the area a surrounded by bold lines corresponds to the key code train regarding the "CTRL" and "S" keys.

FIG. 9 shows an example of a constitution of the registration data with respect to a visible information sheet S shown in FIG. 10.

The sheet S of FIG. 10 includes two visible information areas $a_1$ and $a_2$. The area $a_1$ is defined by the corner point $P_1$ which is specified by coordinates $(X_1, Y_1)$ and the corner point $P_2$ which is specified by coordinates $(X_2, Y_2)$. The key code train "A" corresponds to the area $a_1$. The other area $a_2$ is defined by a corner point $P_1'$ which is specified by coordinates $(X_1', Y_1')$ and a corner point $P_2'$ which is specified by coordinates $(X_2', Y_2')$. The key code train "BCDEF" corresponds to the area $a_2$.

The registration data with regard to the visible information sheet S is shown in FIG. 9. Namely, this data includes: a start code (symbol); a sheet number, a sheet name, number of areas, length of data, defining data of the areas $a_1$ and $a_2$ (comprising the coordinates data of each corner point, length of key code (train) and key code (train)); and an end code (symbol).

Returning to FIG. 8, the CPU 15 controls the input and output operations and processings of the pad portion 4, switch group 13, display 14, key code receiver 16 and transmitter/receiver 17. While the CPU 15 reads or writes data from or into the registering memory 18, it executes various kinds of arithmetic operations and processes by use of various functions regarding the registration and transmission/reception.

For example, the CPU 15 has the following functions and the like with respect to the registration processing.

(1) Function to fetch the registration data received by the transmitter/receiver 17.

(2) Function to store the sheet number in the registration data into the sheet number memory 21 in the registering memory 18 and to store the area data (the coordinates data of the corner points) into the area memory 19.

(3) Function to store the key code train in the registration data into the key code train memory 20 in correspondence to the area.

On the other hand, the CPU 15 has the following functions and the like with respect to the transmission processing.

(1) Function to determine to which area the position of the depressed point detected by the pad portion 4 belongs.

(2) Function to read out the key code train corresponding to the area determined from the key code train memory 20.

To perform the registering work to the input apparatus 1 with the foregoing constitution, a registering program is activated using an external apparatus, e.g., the keyboard 2 and computer 3.

Figure 13:
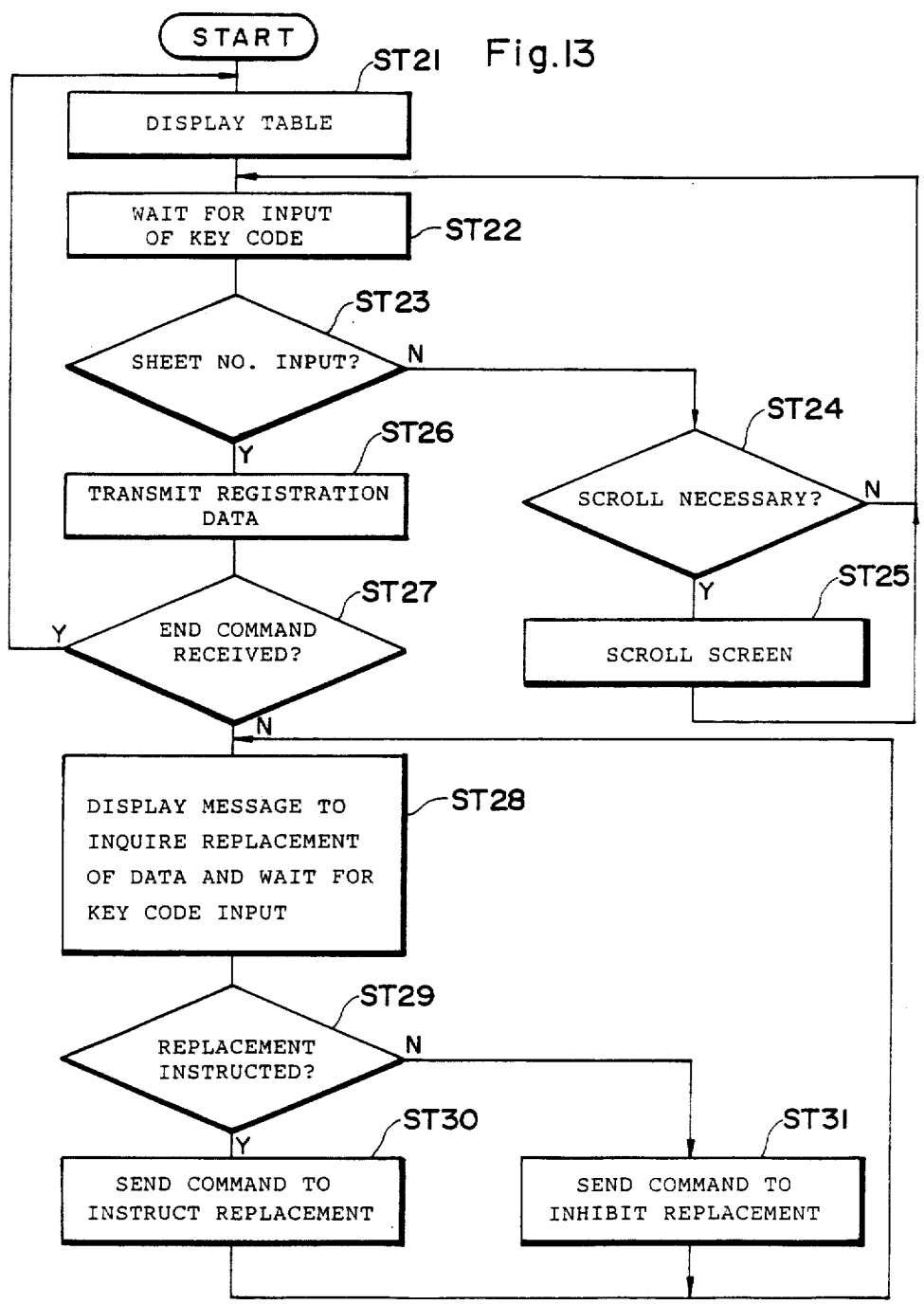
FIG. 13 is a flowchart showing a registering procedure in the computer.

FIG. 13 shows a registering processing procedure by the computer 3. First, in ST21 in the diagram, a table of sheets as shown in FIG. 11 is displayed by the display of the computer 3. This table includes five kinds of registration data of the sheet numbers 1 to 5. The sheet name and memory capacity of each registration data is together shown in this table. When this table is displayed, the computer 3 then enters the standby mode to wait for the transmission of a key code from the keyboard 2 (ST22).

The operator looks at the content on the display screen and selects a desired registration data and inputs the relevant sheet number by operating the keyboard 2. If the desired registration data is not displayed on the screen, the display content on the screen is scrolled until the registration data whose sheet number is 6 or more is displayed on the display (ST24 and ST25).

Figure 12:
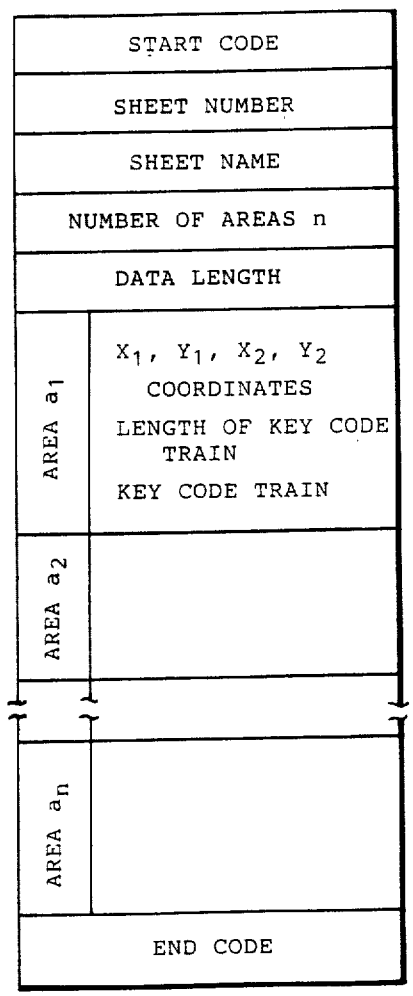
FIG. 12 is an explanatory diagram showing a data format of transmission data.

When the sheet number is designated by the keyboard 2, the answer in ST23 is "YES". The key code of this sheet number is transmitted to the computer 3 through the input apparatus 1. The computer 3 sends the registration data corresponding to the sheet number designated to the input apparatus 1 on the basis of the data format shown in FIG. 12 (ST26).

Figure 14:
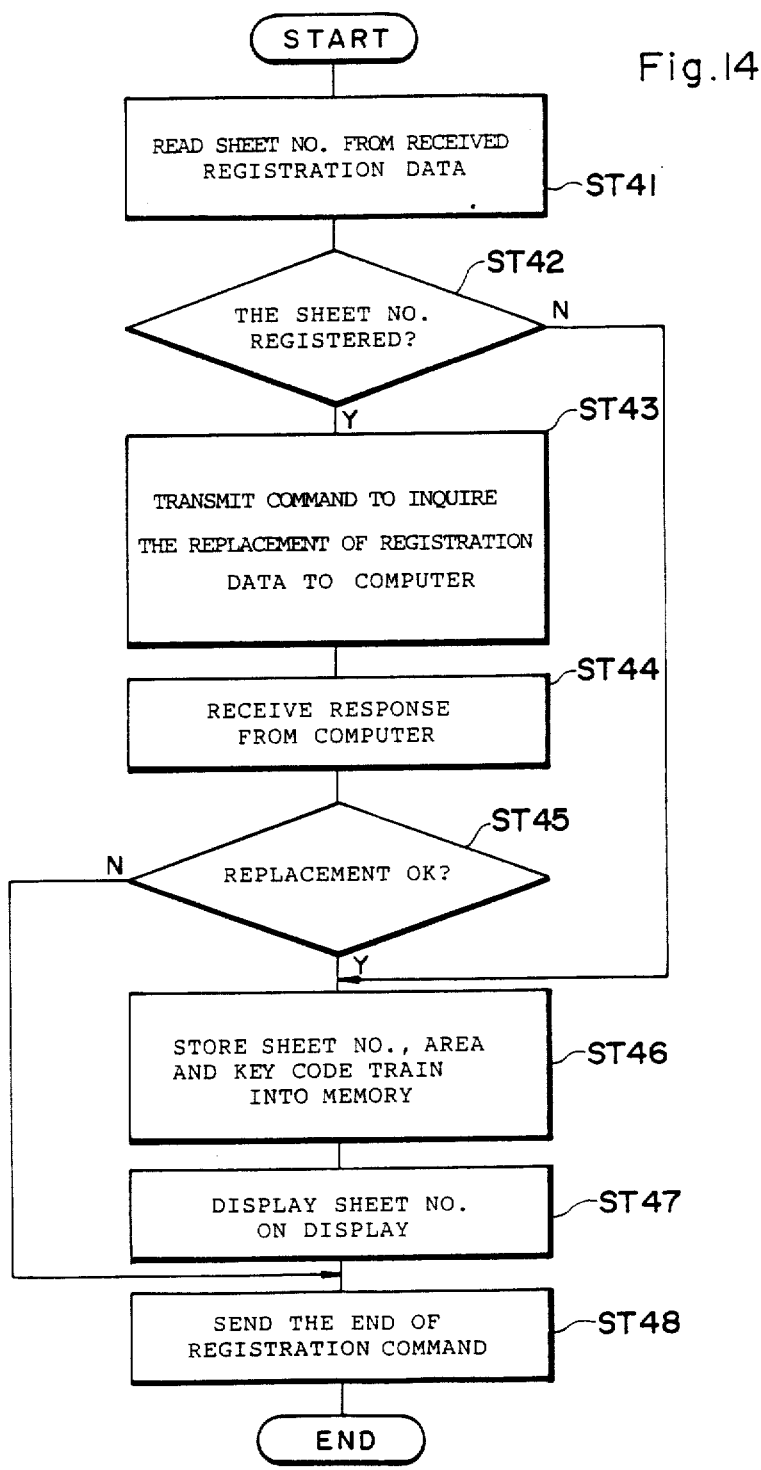
FIG. 14 is a flowchart showing a registering procedure in the input apparatus for computers.

FIG. 14 shows a registering procedure of the registration data in the input apparatus 1. When the registration data is received by the transmitter/receiver 17 at the start time point in FIG. 14, the CPU 15 takes into the reception data from the transmitter/receiver 17 and reads out the sheet number. Further, the CPU 15 refers to the sheet number memory 21 in the registering memory 18 and determines whether the registration data of the sheet number received has already been registered or not (ST41 and ST42).

If it is not registered yet, the answer in ST42 is "NO". The CPU 15 stores the sheet number of the registration data, area data and key code train into the sheet number memory 21, area memory 19 and key code train memory 20 in the registering memory 18 so as to correspond to each other. Then, the sheet number is displayed by the display 14 (ST46, ST47).

In the last ST48, an end of registration command is sent to the computer 3 from the transmitter/register 17. The registration of the registration data of the sheet number is completed.

If the answer in ST42 regarding "Has the sheet number been registered?" is "YES", the CPU 15 produces a command to inquire whether or not the registration data which had already been registered may be replaced by the registration data which has just been received. This command is sent to the computer 3 through the transmitter/receiver 17 (ST43).

In response to the inquiry command, the computer 3 displays a message to inquire whether the registration data may be replaced or not by the display. Then, the computer 3 waits for an instruction which is input by the key operation by the operator (ST28 in FIG. 13).

If the operator wants to instruct the replacement of the registration data, the operator operates the keys on the keyboard 2 in accordance with this instruction. In this case, the answer in ST29 is "YES" and the command to instruct the replacement of the registration data is given to the input apparatus 1 (ST30). If the operator operates the key to inhibit the replacement of the registration data, the answer in ST29 is "NO", so that a command to inhibit the replacement of the registration data is given to the input apparatus 1 (ST31).

The foregoing command is received by the key code receiver 16 in the input apparatus 1 (ST44 in FIG. 14). If this command is the command to instruct the replacement of the registration data, the answer in ST45 is "YES". The registration data is stored into the registering memory 18 in ST46. The sheet number is displayed by the display 14 in ST47 and thereafter, the end of registration command is sent to the computer 3 from the transmitter/receiver 17 (ST48).

If the command to inhibit the replacement of the registration data was received by the input apparatus 1, the answer in ST45 is "NO". In this case, the end of registration command is soon sent to the computer 3 (ST48).

When the end of registration command is received by the computer 3, the answer in ST27 in FIG. 13 is "YES", so that the processing routine is returned to ST21. The table of the registration data is again displayed on the display. The operator starts the operation to register the registration data regarding the next sheet number.

After all of the registering operations and processings concerned with desired registration data were completed in this manner, data input to the computer 3 by the input apparatus 1 becomes possible.

First, by setting the mode switch 9 into the data inputting mode, the sheet number is displayed on the display 14. The operator looks at the display content on the screen and depresses the sheet selecting switch 10 to change the sheet number, thereby selecting the desired visible information sheet (for example, $S_1$) to be used now.

The visible information sheet $S_1$ of the sheet number is inserted into the holder 6. Then, the holder is set to the pad portion 4.

When the program executed or the display on the screen is intended to be temporarily stopped, the operator depresses an arbitrary position in the area a on the visible information sheet $S_1$ by the finger. Thus, the CPU 15 refers to the registering memory 18 and reads out the key code train (in this case, the key code train regarding the "CTRL" and "S" keys) corresponding to the area a from the key code train memory 20 and sends this key code train from the transmitter/receiver 17 to the computer 3 in a manner similar to the foregoing embodiment. Thus, the computer 3 temporarily stops executed program or the display on the screen in accordance with the function of the relevant command.

According to this embodiment, the registration data can be fetched from an external system. Therefore, if the registration data has preliminarily been made, by merely transferring the registration data from the external system, it can be easily registered. There is no need to perform the complicated work to "register" before the input apparatus is used. On the other hand, since the registration data can be held in an external medium, a number of visible information sheets in excess of the capacity of the registering memory can be used.

What is claimed is:

1. An input apparatus for computers comprising:
   area designating means on which a visible information sheet having predetermined visible information can be disposed and which outputs a designation area signal indicative of a designated area of said visible information;
   receiving means for receiving registration data comprising areas of the visible information and respective key codes representative one or more keys corresponding to said areas;
   memory means for storing the registration data received by said receiving means;
   data fetching means for retrieving the corresponding key code from the memory means by reference to said registration data in response to said designation area signal which is given from said area designating means; and
   transmitting means for transmitting the retrieved key code to a computer.

2. An input apparatus according to claim 1, wherein said memory means includes: a memory portion to store data indicative of the area of the visible information; and a memory portion to store the key code in correspondence to the area of the visible information.

3. An input apparatus for computers which is interposed between a keyboard and a computer, comprising:
   area designating means on which a visible information sheet having predetermined visible information can be disposed and which outputs a designation area signal indicative of a designated area of said visible information;
   receiving means for receiving a key code signal from said keyboard;
   registering means for registering the area of the visible information designated by said area designating means with a key code received by said receiving means so that the designated area corresponds with the key code; and
   transmitting means for retrieving the corresponding key code from said registrating means to transmit this key code to the computer in response to the designation area signal given from said area designating means.

4. An input apparatus as in claim 1 further comprising means for causing a key code from depressed keys of a keyboard to also be transmitted by said transmitting means to said computer.

5. An input apparatus as in claim 1 wherein said receiving means, data fetching means and transmitting means comprise a data processor which is coupled to said area designating means, to a keyboard, and to said memory means.

6. An input apparatus as in claim 5 wherein said data processor includes means for defining a closed area of said area designating means from the position of a plurality of points designated by said designating means, and for storing data indicative of said defined area in said memory means.

7. An input apparatus as in claim 6 wherein said data processor includes means for determining whether a presently defined area overlaps with a previously defined area and, if so, providing an indication of an overlap.

8. An input apparatus as in claim 5 wherein said data processor includes means for defining as a word stored in said memory means, as part of said registration data, a key code representing one or more keys of a keyboard.

9. An input apparatus as in claim 5 wherein said data processor includes means for determining a previously defined area which corresponds to a position designated on said area designatinq means, and means for fetching from said memory means the key code corresponding to a determined previously defined area.

10. An input apparatus as in claim 5 wherein said data processor receives said registration data from a computer.

11. An input apparatus as in claim 5 wherein said registration data includes sheet identification data for identifying a sheet used with said area designating means, data which represents a number of defined areas on said sheet, data representing each of said defined areas of said sheet, and data representing key codes corresponding to said defined areas of said sheet, said data processor storing said registration data in said memory means.

12. A registration method for use with an input apparatus for a computer, said apparatus having area designating means on which a visible information sheet having predetermined visible information can be disposed and which outputs a signal indicative of the position of a point designated on the visible information sheet, keyboard means for outputting a key code corresponding to a depression of one or more keys, and memory means for storing registration data, said registration method comprising the steps of;
defining an area specified by points designated on the visible information sheet when signals indicative of the portions of designated points are given by the area designating means,
receiving a key code associated with a defined area and entered from the keyboard means, and
storing the received key code and the associated defined area in correspondence to each other in the memory means as registration data.

13. A method as in claim 12 wherein the step of defining an area further comprises checking whether the defining area overlaps with a previously defined area.

14. A method as in claim 12 further comprising the steps of
determining, when a point on the visible information sheet is designated, whether the area including the designated point is previously stored as a defined area in the memory means, and
reading out the key code corresponding to the defined area from the memory means when the area including the designated point is so stored, and sending the read out key code to the computer.

15. A method of registrating data associated with an X-Y coordinate data input device into a memory comprising the steps of:
(a) defining a desired data area on an X-Y coordinate data input device;
(b) determining if an area defined in step (a) overlaps with a previously defined data area for said X-Y coordinate data input device;
(c) if no overlap occurs, storing in said memory data representing the area defined in step (a) and proceeding to steps (d) through (f);
(d) receiving code data associated with the area defined in step (a);
(e) storing in said memory the received code data from step (d) in association with the area defined in step (a); and
(f) repeating steps (a) through (e) until all desired data areas for said X-Y coordinate data input device are defined.

16. A method as in claim I wherein a visible information sheet is associated with said X-Y coordinate input device and steps (a) through (f) are performed in connection with defined areas and associated information visibly present on said visible information sheet, said memory storing data representing defined areas and associated information visibly present on said sheet.

17. A method as in claim 15 wherein a plurality of visible information sheets are each associated with said X-Y coordinate input device and steps (a) through (f) are performed for each of said sheets, respectively, for defined areas and associated information visibly present on said sheets, said memory storing for each of said sheets data representing defined areas and associated information visibly present in a said sheet in association with data identifying a said sheet.

18. A method as in claim 15 wherein in step (a) an area is defined by entering at said X-Y coordinate input device a plurality of points defining a said area.

19. A method as in claim 18 wherein said plurality of points are two points defined corners of a said area.

20. A data input apparatus comprising:
an X-Y coordinate input pad;
a key board;
a memory; and,
a computer connected to said input pad, said key board and said memory, said computer, during a data registration mode, compring:
means for defining a closed area on said input pad in response to depression of a plurality of points on said pad;
means for determining if a defined closed area overlaps with a previously defined closed area of said pad, means for storing data in said memory corresponding to said defined closed data in response to said determining means determining no overlap;
means for defining as storable data at least one key code received from said key board; and,
means for storing said storable data in association with said stored data corresponding to said defined closed area.

21. An apparatus as in claim 20 wherein said computer further comprises, during a data transmission mode:
means for determining a defined area stored in said memory which corresponding to a depressed point on said pad; and,
means for transmitting the storable data in said memory associated with said determined defined area.

22. An apparatus as in claim 22 further comprising a plurality of overlay sheets associated with said X-Y input pad, each sheet containing visible defined areas and associated visual information, said computer further comprising means for storing in said memory defined areas and associated storable data corresponding to said visual information for each of said sheets in further association with data identifying each sheet.

* * * * *